United States Patent [19]

Fujimasu

[11] Patent Number: 5,492,565
[45] Date of Patent: Feb. 20, 1996

[54] CEMENT COMPOSITION FOR SETTING AND HARDENING OF SOILS

[76] Inventor: Jiro Fujimasu, 5-20-8 Kugahara, Ohta-ku, Tokyo, Japan

[21] Appl. No.: 154,544

[22] Filed: Nov. 19, 1993

[51] Int. Cl.⁶ .......................... C04B 22/12; C04B 24/16
[52] U.S. Cl. .................... 106/718; 106/719; 106/721; 106/793; 106/794; 106/900; 405/266
[58] Field of Search ..................... 106/718, 694, 106/696, 719, 900, 721, 714, 801, 802, 793, 794, DIG. 1, 745, 662; 501/104, 102; 405/264, 266, 267; 264/60, 56; 166/292, 293; 588/257

[56] References Cited

U.S. PATENT DOCUMENTS 3,635,742  1/1972  Fujimasu .................... 106/900
3,642,509  2/1972  Fujimasu .................... 106/900
4,129,449  12/1978  Kojima .................... 405/266

Primary Examiner—Paul Marcantoni
Attorney, Agent, or Firm—Larson and Taylor

[57] ABSTRACT

A composition useful in preparing a cement composition for setting and hardening of soils, comprising:

(1) Slaked Lime;
(2) Magnesium Chloride;
(3) Montmorillonite;
(4) Zirconium; and
(5) Sodium Lignin-Sulfonate.

9 Claims, No Drawings

CEMENT COMPOSITION FOR SETTING AND HARDENING OF SOILS

BACKGROUND OF THE INVENTION

The present invention relates to a cement composition that, when applied in small quantities to soils and mud in general, will help set and harden such soils.

The inventors of the present invention have continued their research on soil-setting and hardening cement for a number of years, the results of which have been published in several issues of *Patent Bulletin*, including the 45th Year of Showa (1970)-No. 24952, the 46th Year of Showa (1971)-No. 6751, and the 52nd Year of Showa (1977)-No. 47483. (Ref. U.S. Pat. No. 3,635,742, "Calcining Alkaline Earth Metal Chlorides with Cellulose and Admixing with Portland Cement", Jan. 18, 1972; and U.S. Pat. No. 3,642,509, "Hydraulic Composition", Feb. 15, 1972.) Particularly, the cement composition of the present invention has major applications in simple paving of roads and setting and hardening of subsoils for concrete or asphalt paving, where a mixture of the cement composition described above with portland cement at the rate of 1 to 5% by weight is applied to soils as a hardening agent. The mixing ratio of the said hardening agent with the soil may vary, depending on the types of projects. Generally, a mixture of 5 to 30% by weight of the agent with the soil will achieve the desired objective of hardening, with application of water sprinkling and/or rollers, as needed.

The soils thus hardened, however, were found to lack a satisfactory degree of properties such as compressive strength, dimensional stability, weather resistance and water absorption, if they were to be used to make such products as bricks for building structures and blocks for road pavement. Consequently, the objective of the present invention is to further improve these material properties and provide the means to produce a material that would adequately meet the requirements as generally used building material in a variety of applications.

To help facilitate the understanding about the present invention, the explanation about the cement composition that appeared in the Patent Bulletin issue of the 52nd Year of Showa (1977)-No. 47483, cited earlier, is reproduced here, as follows:

The material is a composition that consists of 1 part by weight of at least one of slaked lime or fine silica, 1 party by weight of at least one of magnesium chloride or calcium chloride, and ⅙ to ⅓ part by weight of at least one of soda ash, chlorinated lime, zinc chloride or zinc oxide. The explanation further notes that to this composition may be added, as needed dispersing agent such as sodium tripolyphosphate, potassium tripolyphosphate, sodium pyrophosphate, potassium pyrophosphate, sodium lignin-sulfonate, potassium lignin-sulfonate, sodium glycolide and potassium glycolide; and agents to help improve water and weather resistance properties such as ferrous sulfate, sodium bichromate, calcium monohydrogen phosphate, titanium oxide, calcium stearate, aluminum stearate and calcined alum.

SUMMARY OF THE INVENTION

In regard to the present invention, 100 parts by weight of the cement composition for setting and hardening of soils comprise the following constituents:

| | | | |
|---|---|---|---|
| (1) | At least one out of slaked lime or fine silica | 10–30 parts by weight | |
| (2) | At least one out of magnesium chloride, calcium chloride or soda ash | 10–30 parts by weight | |
| (3) | Montmorillonite | 3–20 parts by weight | |
| (4) | Zirconium | 3–20 parts by weight | |
| (5) | At least one out of sodium lignin-sulfonate potassium lignin-phosphate, sodium tripolyphosphate, or potassium tripolyphosphate | 5–60 parts by weight | (Preferably 3.3–40 parts by weight) |

The composition of the present invention, described above, shall be blended with a cement such as portland cement, slag cement, or slag cement and gypsum at an amount of 1 to 3% by weight to constitute a hardening agent, which then shall be mixed into the soils to be treated at a usual amount of 10 to 30% by weight. The resulting soil mixture, with addition of appropriate amounts of water, as needed, and pressure molded, will produce hardened blocks, made of soils as raw material, which can be provided for use as a building material.

DETAILED DESCRIPTION OF THE INVENTION

Of the various constituent elements of the composition described above, slaked lime and fine silica of Item (1) are contributors toward long-term strength of the resulting product, based on the so-called pozzolan reaction. Their intended effect will not be fully realized, however, if their mixing volume is less than 10% of the total volume of the composition, while too much of them in volume, out of balance with other constituent elements, will lead to a drop in strength. Magnesium chloride and the like, listed under constituent element category (2), are agents to help quicken the solidification process, compensating for the process delay caused by blending of dispersing agent such as sodium lignin-sulfonate, as listed under constituent category (5). If their mix ratio by volume falls short of 10% against the total volume of the composition, however, their effect will be limited, while, on the other hand, their volume in excess of 30% would get out of balance with other components and cause a loss in long-term strength of the product, accelerating its efflorescence process. Montmorillonite of category (3) is extremely useful in reducing the water adsorption property of the hardened product an in improving its weather resistant quality, whereas zirconium of category (4) is especially effective in helping produce a strong block by increasing the uniaxial compressive strength and the bending strength of the hardened product. If their respective mixing ratios by volume should be less than 3% of the total volume of the composition, such desired effects will not be obtainable, while their ratios over 20%, on the other hand, will invite an imbalance with other constituent elements and cause a loss in the product's long-term strength, in particular. Dispersing agents, mentioned under category (5), are especially indispensable in relation to the blending of montmorillonite and zirconium as constituent elements in the composition of the present invention. If the volume of their mix against the total volume of the composition should be less than 5%, however, their effect on grain dispersion of other constituent elements will be insufficient, whereas a mix ratio in excess of 60% will cause an imbalance with other constituent elements and a reduction in the strength of the hardened product. On the basis of such test results as summarized above, the mixing ratios for constituent elements (1) to (5) should be kept within the ranges specified above.

EXAMPLES

The results of test conducted on (building) blocks made of hardened soils obtained by use of the hardening agent blended with the composition of the present invention are provided below. For the series of tests referred hereto, required test pieces were manufactured and subjected to tests on compressive strength, dimensional stability, weather resistance and water absorption properties. Test methods and evaluation techniques are also described as follows.

As to preparation of test pieces, except for weathering tests, the JIS-A1210 (a Japanese physical property testing method for tamped soil strength) method was applied, where the material (to be tested) in amorphous state was tamped into a cylinder-shaped test piece of 127 inches in length and 100 inches in diameter.

For compressive strength testing, measurements were taken, in accordance with the provisions pertaining to cement stabilization in the *Outline of Principles for Asphalt Paving*.

For dimensional stability, daily variances in the height of the test piece were measured by a micrometer.

For weatherability testing, a square-shaped, thickboard test piece of 50 centimeters in length and 10 centimeters in thickness was prepared, under the same conditions as in the preparation of a cylinder-shaped test piece previously described. The test piece then was left outdoors for 6 months before being subjected to testing. The testing consisted of the following: the test piece was placed on a thick steel plate, on which a steel ball of 15 centimeters in diameter was dropped from the height of 2 meters in a free fall. The degrees of efflorescence of that test pieces were graded as follows:

Grade 1: The steel ball's impact point showed no mark whatsoever, or if a dent was noticed, it was very minor.

Grade 2: An obvious dent is observed at the impact point, or a cracking appeared within a circle of 20 cm in radius from the impact point.

Grade 3: The impact point crumbled into pieces.

Grade 4: The test piece crumbled into pieces, even away from the impact point, with some of the pieces scattering away.

As for water absorption property, the tamped and hardened test piece was immersed in water for 24 hours following a 7-day curing in the air before being tested.

Table 1 shows the test results conducted on two test pieces (Ex. 1 and Ex. 2), which were prepared with 100 parts of ash obtained from incineration of sludge from the municipal sewage treatment plant of Kyoto with a mixture of 10 parts of the hardening agent containing the composition of this invention and a water content of 18%, considered near optimum. The table also shows comparable results on reference cases (Ref. 1 nd Ref. 2). It should be noted, however, that the hardening agents prepared for the test pieces, Ex. 1 and Ex. 2, in Table 1 were obtained by mixing the compositions, specified for Ex. 1 and Ex. 2 in Table 2, with portland cement at the ratios by weight of 1% and 3%, respectively.

It is further noted that Ref. 1 in Table 1 relates to the test results on the composition described in *Patent Bulletin*—the 52nd Year of Showa (1977)- No. 47483 issue, cited earlier. In preparation of the test piece for Ref. 1, out of the constituent element categories (1) to (5) in Table 2, the composition prepared with the mixing ratios for (1) and (2) specified in the Ref. 1 column of the said Table was blended with portland cement at the ratio by weight of 3%, as in the case of Ex. 2.

It is further pointed out that ref. 2 in Table 1 relates to test results obtained, when portland cement alone was used as the hardening agent.

TABLE 1

| (Raw Material: Ash from Incineration of Sewage Sludge) | | | | |
|---|---|---|---|---|
| | C.S.* Kgf/cm$^2$ | D.S.* Max. mm | W.A.* % | Weath.* Grade |
| Ex. 1 | 55 | 0.125 | 1 | 1 |
| Ex. 2 | 53 | 0.13 | 3 | 1 |
| Ref. 1 | 48 | 0.165 | 6 | 2 |
| Ref. 2 | 18 | 0.3 | 13 | 3 |

Legend:
C.S.: Compressive Strength
D.S.: Dimensional Stability
W.A.: Water Absorption Property
Weath: Weather Resistance Property In Table 1, all numerical values except those for weatherability represent actual measurements on the test pieces at their material age of 7 days (after passage of 7 days of curing in the air).

TABLE 2

| (Composition for Setting and Hardening) | | | |
|---|---|---|---|
| | Ex. 1 (1%) | Ex. 2 (2%) | Ref. 1 (3%) |
| (1) Slaked Lime | 20 | 60 | 66.7 |
| (2) Magnesium Chloride | 20 | 20 | 23.3 |
| (3) Montmorillonite | 10 | 5 | — |
| (4) Zirconium | 10 | 5 | — |
| (5) Sodium Lignin-Sulfonate | 40 | 10 | 10.0 |
| Total: | 100 parts | 100 parts | 100 parts |

Table 2 shows the test results on compressive strength, dimensional stability, water absorption and weatherability properties, when soils are the object for setting and hardening. The raw material selected was Kanto loam soil with a 25% water content, obtained in Koganeishi, Tokyo. The test pieces were prepared exactly the same way as those from the incinerated sewage sludge in Kyoto were done, the test results of which were shown in Table 1.

TABLE 3

| (Soils) | | | | |
|---|---|---|---|---|
| | C.S.* Kgf/cm$^2$ | D.S.* Max. mm | W.A.* % | Weath.* Grade |
| Ex. 1 | 54 (72) | 0.12 | 2.0 | 1 |
| Ex. 2 | 50 | 0.15 | 2.5 | 1 |
| Ref. 1 | 46 | 0.17 | 7.5 | 2 |
| Ex. 3 | 53 (75) | 0.13 | 1.8 | 1 |
| Ex. 4 | 51 | 0.18 | 2.1 | 1 |
| Ref. 2 | 45 | 0.19 | 8.6 | 1 |
| Ref. 3 | 20 | 0.4 | 12.3 | 4 & lower |

TABLE 3-continued

| | (Soils) | | | |
|---|---|---|---|---|
| | C.S.* Kgf/cm² | D.S.* Max. mm | W.A.* % | Weath.* Grade |

Legend:
C.S.: Compressive Strength
D.S.: Dimensional Stability
W.A.: Water Absorption Property
Weath: Weather Resistance Property In Table 3, the hardening agent used for mixing with soil in preparation for test pieces Ex. 1 and Ex. 2 consisted of the blending of the composition comprising component elements in the ratios specified in Ex. 1 and Ex. 2 columns of Table 4 with portland cement at the ratio by weight of 1%. Likewise, the hardening agent used for mixing soil in preparation for test pieces Ex. 3 and Ex. 4 consisted of the blending of the composition comprising component elements in the ratios specified in Ex. 3 and Ex. 4 columns of Table 4 with portland cement at the ratio by weight of 3%. Ref. 1 and Ref. 2 in Table 3 relate to the invention described in *Patent Bulletin*—the 52nd Year of Showa (1977) - No. 47483 issue, cited earlier, where the hardening agent used for preparing respective test pieces was the intermixture of the composition with its component elements blended in the ratios prescribed in Ref. 1 and Ref. 2 columns of Table 4 and portland cement at the ratios by weight of 1% and 3%, respectively. The test piece for Ref. 3 in Table 3, on the other hand, was prepared with portland cement as an only hardening agent. Incidentally, materials (1) to (5) in Table 4 correspond to those in Table 2.

Next, Table 5 shows the test results when sludge is the object of setting and hardening. The raw material used for these tests was the sea-bottom sludge dredged off the shore of Haneda, Ota-ku, Tokyo, which had water content of 110%. Preparation formula for test pieces was identical to that for the other cases already described. The hardening agent applied for blending with the sludge was the same agent used for hardening of soils, previously described. That is, the composition comprising various elements listed in Table 4 was mixed with portland cement. The mixing ratios of 1% and 3% were the same. However, in this series of tests, only the compressive strength and dimensional stability were measured.

TABLE 4

| | (Composition) | | | | | |
|---|---|---|---|---|---|---|
| | Ex. 1 (1)% | Ex. 2 (1%) | Ref. 1 (1%) | Ex. 3 (3%) | Ex. 4 (3%) | Ref. 2 (3%) |
| 1) Slaked Lime | 20 | 10 | 30 | 60 | 53.3 | 66.7 |
| 2) Magnesium Chloride | 20 | 10 | 20 | 20 | 20 | 23.3 |
| 3) Montmorillonite | 10 | 30 | — | 5 | 11.7 | — |
| 4) Zirconium | 10 | 30 | — | 5 | 11.7 | — |
| 5) Sodium Lignin-Sulfonate | 40 | 20 | 50 | 10 | 3.3 | 10 |
| | 100 parts | 100 parts | 100 parts | 100 parts | 100 parts | 100 parts |

Next, an example is presented, where uncalcined bricks and uncalcined interlocking (building) blocks for paving were manufactured, using the previously described ash (with a 55% water content) obtained by incineration of sewage sludge from the municipal sewage treatment plant of Kyoto as the object of hardening. The hardening agent used was portland cement with a 1% by weight mixture of the composition specified in the Ex. 1 column of Table 2. Thirty parts of the hardening agent was added, together with some water, to 100 parts of ash from incineration, with the resulting mixture then fed into molds to be formed under tamping and compression into bricks (15 t/whole surface), respectively. The dimension of the formed brick was 210 mm ×100 mm×60 mm, and that of the interlocking block 222 mm ×110 mm×60 mm (maximum external dimensions). As for weight, the brick weighed 2.11 kg at the age of 7 days and stabilized down at 2.03 kg at 28 days in age. Similarly, the interlocking block, weighing at 2.3 kg at 7 days, became stable at 2.2 kg in weight at 28 days. Compressive strength measurements at corresponding times were: for the brick, 152 kgf/cm² at 7 days and 210 kgf/cm² at 28 days, and for the interlocking block, 161 kgf/cm² at 7 days and 235 kgf/cm² at 28 days. It should also be noted that a taper abrasion test run in accordance with JIS K7204 on the interlocking block produced a measurement of 627 mm g, which should be considered a good performance as it stands nearly a half of 1261 mm g, obtained when portland cement alone was used as the hardening agent.

TABLE 5

| | (Sludge) | |
|---|---|---|
| | Compressive Strength Kgf/CM² | Dimensional Stability Max. mm |
| Ex. 1 | 26 (31) | 0.4 |
| Ex. 2 | 24 | 0.4 |
| Ref. 1 | 21 | 0.7 |
| Ex. 3 | 21 (32) | 0.4 |
| Ex. 4 | 20 | 0.4 |
| Ref. 2 | 18 | 0.8 |
| Ref. 3 | 5 | 1.1 |

An analysis was conducted, from the perspective of pollution control, into the heavy metals content of the ash from incineration of sludge, which was used as the raw material for the bricks and the like. The results showed the following (in ppm):

As: 20

Zn: 132

Cd: 1.2

Cu: 954

Cr (VI): 310

F: 260

No elements such as heavy metals and the like, however, were detected in the products-bricks and interlocking blocks, described earlier.

A comparative analysis of Tables 1, 3 and 5 also shows that so long as the intermixing proportions of component elements of the composition of the present invention remain within appropriate ranges, the mixing ratio of 1% or 3% of the composition with the hardening agent consisting mainly of portland cement would not make much difference in the final outcome in the product properties. It also shows that with a 3% by volume mixture of the composition with the hardening agent, the initial result at 7 days appears inferior to that of a 1% mixture, but after a sufficient aging, at, say, 30 days, the comparative standings in compressive strength reverse themselves as indicated by the figures in parenthesis. Effect of the Invention:

As stated earlier, the main objective of the present invention is to further improve the material properties of the composition of the previous invention, described in the *Patent Bulletin* issue of the 52nd Year of Showa (1977) - No. 47483. As clearly illustrated by various test results described earlier, the composition of the present invention provides an effective means of producing hardened products with material properties superior to or at least comparable to those of the products produced by the composition of the previous invention in such terms as compressive strength, dimensional stability, water absorption and weatherability, even with a far smaller amount than that required of the composition of the previous invention, as long as the conditions such as the mixing ratio of the hardening agent with the raw material or the object of hardening such as soils and sludge remain identical. Consequently, the present invention makes it possible to provide in an uncalcined form a variety of building materials such as bricks, wall tiles, and blocks for road paving that have been produced in the past only after consuming a great deal of thermal energy in the process. Particularly with reference to sludge that has been a matter of major concern as a source of pollution, the present invention will not only remove automatically its pollutant characteristics, but also make possible a remarkable achievement of converting such an undesirable material into useful building materials. Thus, the present invention will make a great contribution toward further development of the industrial economy and greater improvement in environmental conditions.

It is claimed:

1. A composition useful in preparing a cement composition for setting and hardening of soils, comprising:
   (1) 10 to 30 parts Slaked Lime;
   (2) 10 to 30 parts Magnesium Chloride;
   (3) 3 to 20 parts Montmorillonite;
   (4) 3 to 20 parts Zirconium; and
   (5) 3.3 to 40 parts Sodium Lignin-Sulfonate, said composition containing 100 parts by weight.

2. A composition useful in preparing a cement composition for setting and hardening of soils, comprising:
   (1) Slaked Lime at 20% by weight;
   (2) Magnesium Chloride at 20% by weight;
   (3) Montmorillonite at 10% by weight;
   (4) Zirconium at 10% by weight; and
   (5) Sodium Lignin-Sulfonate at 40% by weight.

3. A composition useful in preparing a cement composition for setting and hardening of soils, comprising:
   (1) Slaked Lime at 60% by weight;
   (2) Magnesium Chloride at 20% by weight;
   (3) Montmorillonite at 5% by weight;
   (4) Zirconium at 5% by weight; and
   (5) Sodium Lignin-Sulfonate at 10% by weight.

4. A cement composition for setting and hardening of soils comprising cement and about 1 to 3% by weight of the composition of claim 1.

5. A cement composition for setting and hardening of soils comprising cement and about 1 to 3% by weight of the composition of claim 2.

6. A cement composition for setting and hardening of soils comprising cement and about 1 to 3% by weight of the composition of claim 3.

7. A cement composition according to claim 4 wherein the cement is portland cement.

8. An article of manufacture comprising a hardened admixture of soil and cement 10 to 30% by weight of the cement composition of claim 4.

9. An article of manufacture according to claim 8 wherein the admixture is molded.

* * * * *